Nov. 19, 1940.    G. H. PARKER    2,222,265
WHEEL SUSPENSION
Filed Jan. 23, 1939
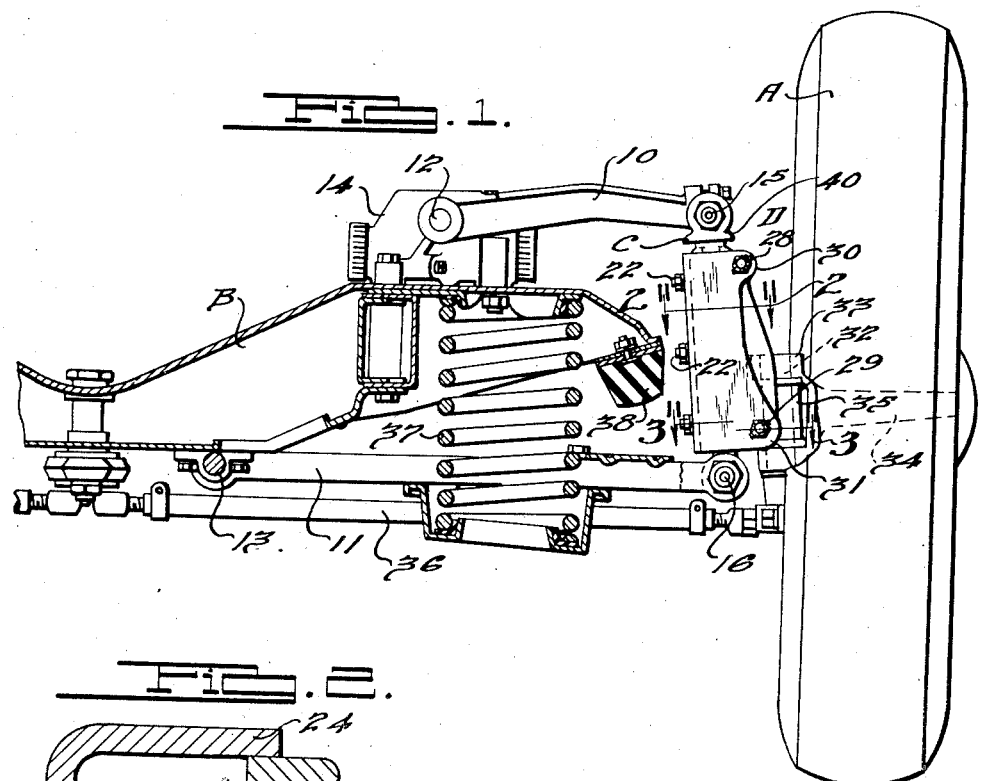
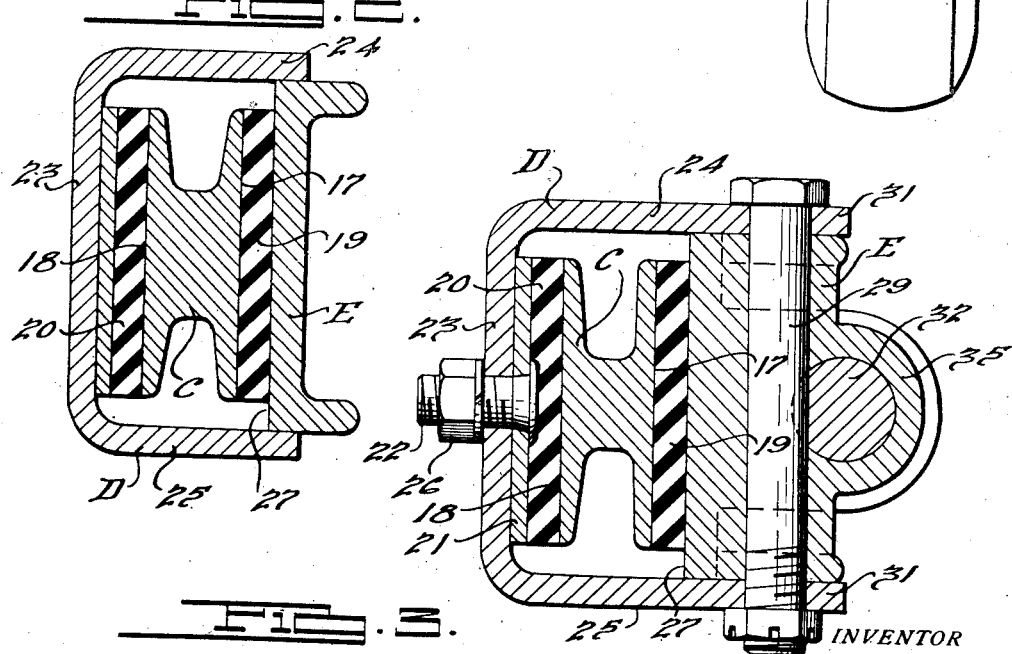
INVENTOR
BY Glenn H. Parker.
ATTORNEYS.

Patented Nov. 19, 1940

2,222,265

UNITED STATES PATENT OFFICE 2,222,265

WHEEL SUSPENSION

Glenn H. Parker, Royal Oak, Mich., assignor to Chrysler Corporation, Highland Park, Mich., a corporation of Delaware Application January 23, 1939, Serial No. 252,266

18 Claims. (Cl. 267—20)

This invention relates to motor vehicles and refers more particularly to improvements in suspensions for ground wheels of motor vehicles.

It is an object of my invention to provide simplified and improved means for insulating motor vehicle ground wheels from the supported vehicle frame and body structure whereby road shocks and vibrations are effectively dampened against transmission to the vehicle structure.

Another object is to improve the riding qualities of the vehicle by means providing limited movement in all directions of the wheel relative to the frame structure, preferably by the provision of cushioning means of a rugged character so disposed as to absorb the road shocks and vibrations closely adjacent the wheel and before the shocks act on the suspension system for the wheel.

My invention is especially adapted for use in connection with independently sprung ground wheels and embodies a wheel supporting arm (steering knuckle support arm in the case of a steerable ground wheel) which is insulated from the ground wheel whereby the road shocks are absorbed at points between the ground wheels and the independent suspension linkage. Such an arrangement eliminates the necessity or desirability of providing shock absorbing bushings and the like at the various pivots of the linkage system and affords a universal insulated support of the wheel on the support arm.

Further objects and advantages of my invention will be more apparent from the following detail description of one illustrative embodiment of my invention, reference being had to the accompanying drawing in which:

Fig. 1 is a front elevational view of a typical ground wheel suspension embodying my invention.

Fig. 2 is a sectional plan view taken as indicated by line 2—2 on Fig. 1.

Fig. 3 is a further sectional plan view taken as indicated by line 3—3 of Fig. 1.

In the drawing I have illustrated my invention in connection with a steerable ground wheel A, it being understood that the opposite wheel is similarly suspended. The suspension system is, in general, a well known type embodying upper and lower wish-bone links 10 and 11 which are pivotally supported on the vehicle frame structure B at 12 and 13 respectively. If desired, the pivot 12 may be provided by a shock absorber 14.

The links 10 and 11 extend laterally outwardly for pivotal connection at 15 and 16 respectively with the upper and lower ends of the upright knuckle support arm C which is formed with the opposite side faces 17, 18 to which are securely bonded or vulcanized the upright strips 19, 20 of shock absorbing yielding material, preferably rubber composition of any suitable well known character. The inner face of the rubber body 20 is likewise securely bonded to a plate 21 carrying a series of inwardly extending pins 22 which project through the inner wall 23 of a channeled housing or cover member D whose flanges 24, 25 enclose the front and rear faces of arm C and rubber bodies 19, 20 in spaced relationship therefrom. Fasteners 26 securely maintain plate 21 in assembled position with the cover D so as to form a structural part of the housing.

The outer face of rubber body 19 is also securely bonded to the inner flat face 27 of a knuckle member E securely bolted at 28, 29 to the ear portions 30, 31 of the housing flanges 24, 25. The lower bolt 29 serves as a retainer for the king-pin 32 (Fig. 3) which swivels the knuckle yoke 33 of the usual wheel journalling stub axle 34. The yoke 33 receives the portion 35 of knuckle member E. Suitable steering mechanism is provided such as tie rod 36 for swinging yoke 33 and axle 34 about the king-pin 32 when steering the wheel A to the right and left.

When wheel A rises and falls, the rigid assembly of parts D and E comprising wheel carrying means acts through bodies 19 and 20 to stress the rubber in shear in transmitting the movement to arm C, the links 10 and 11 oscillating and maintaining the wheel A at approximately constant caster and camber angles. A coil spring 37 yieldingly supports frame B on lower link 11, a bumper 38 serving to yieldingly limit relative movement of link and frame B.

The arm C is completely insulated by bodies 19 and 20 from knuckle members E and 33 and these members may have a limited movement in any direction relative to the arm in absorbing shocks and vibrations. A high degree of lateral stability is provided between the wheel A and frame B as when the wheel tends to be displaced laterally one of the bodies 19, 20 is stressed compressively and the other is placed under tension depending on whether the wheel is thrust outwardly or inwardly. Fore and aft wheel thrusts act to stress the bodies 19, 20 in shear thereby effectively and efficiently absorbing and cushioning the jolts and vibrations. As a feature of safety in the event of failure of the bodies 19, 20 the parts will still stay in assembled relationship sufficiently to prevent loss of driving control as the housing D has its ends brought closely adjacent the outer ends of links 10 and 11 for engagement therewith under such unusual conditions.

If desired, the upper end of the arm C may have a boss 40 serving as a stop abutment for the upper end of housing D to carry the load in the event of failure of the rubber bodies 19 and 20.

It is further noted that the walls 24, 25 serve to limit relative movement of the arm C in a fore and aft direction both during normal shearing of the rubber bodies as well as in the event of failure of such bodies, the portion E and wall 23 serving to limit lateral movement of the arm C.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a suspension for a motor vehicle ground wheel, an upright wheel support arm, link means for swingingly supporting said arm on the vehicle frame to accommodate rising and falling of the wheel independently of the remaining wheels of the vehicle, support means for the wheel, and means including a non-metallic body of deformable material yieldingly connecting the support means with said support arm and accommodating limited movement of the wheel relative to the support arm.

2. In a suspension for a motor vehicle ground wheel, wheel carrying means, an upright wheel supporting arm swingingly connected to the vehicle frame structure to accommodate rising and falling of the wheel independently of the remaining ground wheels of the vehicle, and means yieldingly connecting said carrying means with said arm accommodating limited universal movement of the wheel relative to the arm.

3. In a suspension for a motor vehicle ground wheel, wheel carrying means, an upright wheel supporting arm, linkages swingingly connected to the vehicle frame structure and to the opposite ends of said arm to accommodate rising and falling of the wheel independently of the remaining ground wheels of the vehicle, and means including a non-metallic body for yieldingly connecting said arm with said wheel carrying means.

4. In a suspension for a motor vehicle ground wheel, wheel carrying means, an upright wheel supporting arm, linkages swingingly connected to the vehicle frame structure and to the opposite ends of said arm to accommodate rising and falling of the wheel independently of the remaining ground wheels of the vehicle, and means including a rubber body for yieldingly connecting said arm and carrying means for accommodating relative universal movement therebetween.

5. In a suspension for a motor vehicle ground wheel, wheel carrying means, an upright wheel supporting arm swingingly connected to the vehicle frame structure to accommodate rising and falling of the wheel independently of the remaining ground wheels of the vehicle, and means yieldingly maintaining said arm and carrying means spaced from each other while serving to connect them together for limited relative movement therebetween.

6. In a suspension for a motor vehicle ground wheel, wheel carrying means, an upright wheel supporting arm swingingly connected to the vehicle frame structure to accommodate rising and falling of the wheel independently of the remaining ground wheels of the vehicle, and means yieldingly maintaining said arm and carrying means spaced from each other while serving to connect them together for limited universal movement relative to each other.

7. In a suspension for a motor vehicle ground wheel, an upright wheel supporting arm structure, linkages swingingly connected to the vehicle frame structure and to the opposite ends of said arm, a wheel carrying structure, and a strip of rubber bonded to and between said arm and wheel carrying structures.

8. In a suspension for a motor vehicle ground wheel, an upright wheel supporting arm structure, linkages swingingly connected to the vehicle frame structure and to the opposite ends of said arm, a wheel carrying structure, and a pair of rubber bodies bonded to opposite faces of said arm and to said wheel carrying structure, said bodies maintaining a yielding cushion between said structures.

9. In a suspension for a motor vehicle ground wheel, an upright wheel supporting arm structure swingingly connected to the vehicle frame structure, a wheel carrying structure, a pair of rubber bodies bonded to opposite faces of said arm, one of said bodies being secured to said wheel carrying structure, said wheel carrying structure including a housing extending at least partially around and spaced from said arm and bonded to the other of said bodies, said bodies maintaining a yielding cushion between said structures.

10. In a suspension for a motor vehicle ground wheel, an upright wheel supporting arm structure swingingly connected to the vehicle frame structure, a wheel carrying structure, a pair of rubber bodies bonded to opposite faces of said arm, one of said bodies being secured to said wheel carrying structure, said wheel carrying structure including a housing extending at least partially around and spaced from said arm, a plate bonded to the other of said structures and secured to said housing, said bodies providing a yielding cushion between said structures.

11. In a suspension for a motor vehicle ground wheel, wheel carrying means, an upright wheel supporting arm swingingly connected to the vehicle frame structure to accommodate rising and falling of the wheel independently of the remaining ground wheels of the vehicle, means yieldingly connecting said carrying means with said arm accommodating limited universal movement of the wheel relative to the arm, and means engageable with said wheel carrying means in the event of failure of said yielding connecting means for supporting the vehicle frame on the wheel.

12. In a suspension for a motor vehicle ground wheel, an upright wheel support arm, link means for swingingly supporting said arm on the vehicle frame to accommodate rising and falling of the wheel independently of the remaining wheels of the vehicle, supporting means for the wheel, and means including a non-metallic body of deformable material yieldingly connecting the support means with said support arm and accommodating limited movement of the wheel relative to the support arm, said support means being spaced from said link means and adapted for supporting engagement therewith in the event of failure of said yieldingly connecting means.

13. In a suspension for a motor vehicle ground wheel, an upright wheel supporting arm structure swingingly connected to the vehicle frame structure, a wheel carrying structure, a pair of rubber bodies bonded to opposite faces of said arm, one of said bodies being secured to said wheel carrying structure, said wheel carrying structure including a housing extending at least partially around and spaced from said arm and bonded to the other of said bodies, said bodies maintaining a yielding cushion between said structures, and means engageable with said housing in the event of failure of said bodies for supporting the frame structure on the wheel.

14. In a suspension for a motor vehicle ground wheel, wheel carrying means, an upright wheel supporting arm swingingly connected to the vehicle frame structure to accommodate rising and falling of the wheel independently of the remaining ground wheels of the vehicle, and means yieldingly connecting said carrying means with said arm accommodating limited universal movement of the wheel relative to the arm, said yielding means including a non-metallic body of deformable material subjected to shear stress during rising and falling of said wheel.

15. In a suspension for a motor vehicle ground wheel, wheel carrying means, an upright wheel supporting arm swingingly connected to the vehicle frame structure to accommodate rising and falling of the wheel independently of the remaining ground wheels of the vehicle, and means yieldingly connecting said carrying means with said arm accommodating limited universal movement of the wheel relative to the arm, said yielding means including a non-metallic body of deformable material subjected to compressive stress in resisting lateral movement of the wheel relative to the frame structure.

16. In a suspension for a motor vehicle ground wheel, wheel carrying means, an upright wheel supporting arm swingingly connected to the vehicle frame structure to accommodate rising and falling of the wheel independently of the remaining ground wheels of the vehicle, and means yieldingly connecting said carrying means with said arm accommodating limited universal movement of the wheel relative to the arm, said yielding means including a non-metallic body of deformable material subjected to shear stress during rising and falling of said wheel and subjected to compressive stress in resisting lateral movement of the wheel relative to the frame structure.

17. In a suspension for a motor vehicle ground wheel, wheel carrying means, an upright wheel supporting arm swingingly connected to the vehicle frame structure to accommodate rising and falling of the wheel independently of the remaining ground wheels of the vehicle, means yieldingly connecting said carrying means with said arm accommodating limited universal movement of the wheel relative to the arm, and means engageable with said wheel carrying means in the event of failure of said yielding connecting means for limited displacement of said wheel supporting arm in all directions relative to said frame structure.

18. In a suspension for a motor vehicle ground wheel, an upright wheel support arm, link means for swingingly supporting said arm on the vehicle frame to accommodate rising and falling of the wheel independently of the remaining wheels of the vehicle, support means for the wheel, and means including a plurality of non-metallic bodies of deformable material yieldingly connecting the support means with said support arm at points spaced from each other, said bodies accommodating limited movement of the wheel relative to the support arm.

GLENN H. PARKER.

CERTIFICATE OF CORRECTION.

Patent No. 2,222,265.                                           November 19, 1940.

GLENN H. PARKER.

It is hereby certified that error appears in the printed specification of the above numbered patent requiring correction as follows: Page 2, first column, lines 65 and 75, claims 5 and 6 respectively, after "arm" insert the comma and word --, linkages--; same page and column, line 66, and second column, line 1, claims 5 and 6 respectively, after "structure" insert --and to the opposite ends of said arm--; and that the said Letters Patent should be read with this correction therein that the same may conform to the record of the case in the Patent Office.

Signed and sealed this 8th day of April, A. D. 1941.

(Seal)
Henry Van Arsdale,
Acting Commissioner of Patents.